United States Patent [19]
Naini et al.

[11] Patent Number: 5,276,635
[45] Date of Patent: Jan. 4, 1994

[54] METHOD AND APPARATUS FOR PERFORMING CARRY LOOK-AHEAD ADDITION IN A DATA PROCESSOR

[75] Inventors: Ajay Naini; William C. Anderson, both of Austin, Tex.

[73] Assignee: Motorola, Inc., Schaumburg, Ill.

[21] Appl. No.: 69,646

[22] Filed: Jun. 1, 1993

Related U.S. Application Data

[63] Continuation of Ser. No. 830,825, Feb. 4, 1992, abandoned.

[51] Int. Cl.⁵ .............................................. G06F 7/50
[52] U.S. Cl. ...................................... 364/787; 364/786
[58] Field of Search ................................ 364/786, 787

[56] References Cited

U.S. PATENT DOCUMENTS

| | | | |
|---|---|---|---|
| 4,584,661 | 4/1986 | Grundland | 364/787 |
| 4,962,471 | 10/1990 | Cornelissen | 364/787 |
| 5,136,539 | 8/1992 | Kumar | 364/787 |
| 5,166,899 | 11/1992 | Lamb | 364/787 |

OTHER PUBLICATIONS

"A 3.1ns 32b CMOS Adder in Multiple Output Domino Logic," written by Inseok S. Wang and Aaron L. Fisher, published in IEEE ISSCC Conference Feb. 1988, at pp. 140–141, 332–333.

"High-Speed Addition in CMOS," written by Nhon T. Quach, et al, published in Stanford University Computer Systems Laboratory in Feb. 1990, at pp. 1–13.

"Introduction to Arithmetic for Digital Systems Designers", written by Shlomo Waser and Michael J. Flynn, Holt, Rinehart and Winston 1982, at pp. 83–88.

*Primary Examiner*—Tan V. Mai
*Attorney, Agent, or Firm*—Charlotte B. Whitaker

[57] ABSTRACT

A carry look-ahead (CLA) adder accommodates a late carry-in from a low-order external 32-bit adder to enable a 96-bit addition to be performed in the same time in which the CLA adder (60) performs a 64-bit addition. Within each adder slice, intermediate group propagate and group generate terms are generated for each bit location in the adder (60), while the adder simultaneously generates an n-bit group propagate and group generate term. The intermediate group propagate and group generate terms are combined with carry-in terms to generate, in parallel, local carry-out terms within each adder slice. The local carry-out terms and intermediate group propagate and group generate terms are used to form a carry chain path which allows the adder to delay the carry-in of an external carry term.

10 Claims, 8 Drawing Sheets

| CLA ADDER 10 | CRITICAL PATH | A,B–G₀ | G₀–G₃:₀ | G₃:₀–G₁₅:₀ | G₁₅:₀–C₁₆ | C₁₆–C₃₂ | C₃₂–C₄₈ | C₄₈–C₅₂ | C₅₂–C₅₆ | C₅₆–C₆₀ | C₆₀–C₆₁ | C₆₁–C₆₂ | C₆₂–C₆₃ | C₆₃–S₆₃ | TOTAL= 5.4NS |
|---|---|---|---|---|---|---|---|---|---|---|---|---|---|---|---|
|  | DELAY (NS) | 0.4 | 0.65 | 0.65 | 0.3 | 0.35 | 0.35 | 0.35 | 0.35 | 0.35 | 0.35 | 0.35 | 0.35 | 0.6 |  |
| CLA ADDER 60 | CRITICAL PATH | A,B–G₀ | G₀–G₃:₀ | G₃:₀–G₁₅:₀ | G₁₅:₀–G₄₇:₀ | G₄₇:₀–C₄₈ | C₄₈–C₆₀ | C₆₀–C₆₃ | C₆₃–S₆₃ | | | | | | TOTAL= 4.5NS |
|  | DELAY (NS) | 0.4 | 0.9 | 0.9 | 0.7 | 0.3 | 0.35 | 0.35 | 0.6 | | | | | | |

METHOD AND APPARATUS FOR PERFORMING CARRY LOOK-AHEAD ADDITION IN A DATA PROCESSOR

This application is a continuation of prior application Ser. No. 07/830,825, filed Feb. 4, 1992 now abandoned.

FIELD OF THE INVENTION

This invention relates generally to data processors, and more particularly to data processors performing carry look-ahead addition.

BACKGROUND OF THE INVENTION

Carry look-ahead (CLA) addition has become one of the more popular techniques for implementing fast adders in data processors. The popularity of designs employing CLA addition stems largely from their modularity, minimal area, and high speed advantages. The recursive method of CLA addition is well known. In conventional CLA designs, fan-in limits carry look-ahead to groups of four bits, therefore, multi-level look-ahead structures are used for adders with larger word sizes (e.g. 64-bit). As the word size of adders increases, however, the conventional carry-chain delay limits the cycle time (minimum time required to perform the CLA addition). Thus, for high performance data processors, implementation of fast adders requires the minimization of the carry-chain latency.

Although several techniques have been employed to minimize the carry chain latency, generally these designs require additional silicon area for their implementation. In one such technique a 32-bit CMOS adder is implemented in multiple output domino logic (MODL) to compensate for the carry-chain delay. In this design, the carry outputs are generated in parallel; however, the MODL design operates on 2-bit groups rather than 4-bit groups. Thus, although the MODL adder is faster than a classic CLA design, the MODL requires more silicon area due to the non-Manchester design style. In another technique, a CLA design does parallel group generates from the input operands, but uses a conditional-sum design approach, which once again is hardware intensive. Typically, previous CLA designs have not minimized the carry chain latency without increasing the silicon area required for implementation of the CLA design.

SUMMARY OF THE INVENTION

A carry look-ahead (CLA) adder having a predetermined number of adder levels comprising a predetermined number of n-bit adder slices, where n is an integer equal in magnitude to a fan-in value for the adder, and an improved method for adding a first operand to a second operand using carry look-ahead addition in the CLA adder. In response to receiving the first and second operands, a predetermined number of intermediate group propagate and group generate terms are generated within each adder slice, for each bit location in the adder. The adder slice simultaneously generates a predetermined number of n-bit group propagate and group generate terms. The predetermined number of intermediate group propagate and group generate terms are combined with a carry-in term to generate, in parallel, a predetermined number of local carry-out terms within each adder slice. Within each adder slice, the most significant one of the local carry-out terms is generated in a single gate delay. The n-bit group propagate and group generate terms are used to generate the next level group propagate and group generate terms. Since the local carry-out terms within each adder slice are generated in parallel, the adder has a greater delay tolerance for a delayed carry-in of an external carry term, than a conventional CLA adder. This tolerance of a delayed carry-in of the external carry term facilitates the construction of larger adders.

DETAILED DESCRIPTION OF A PREFERRED EMBODIMENT

Figure 1:
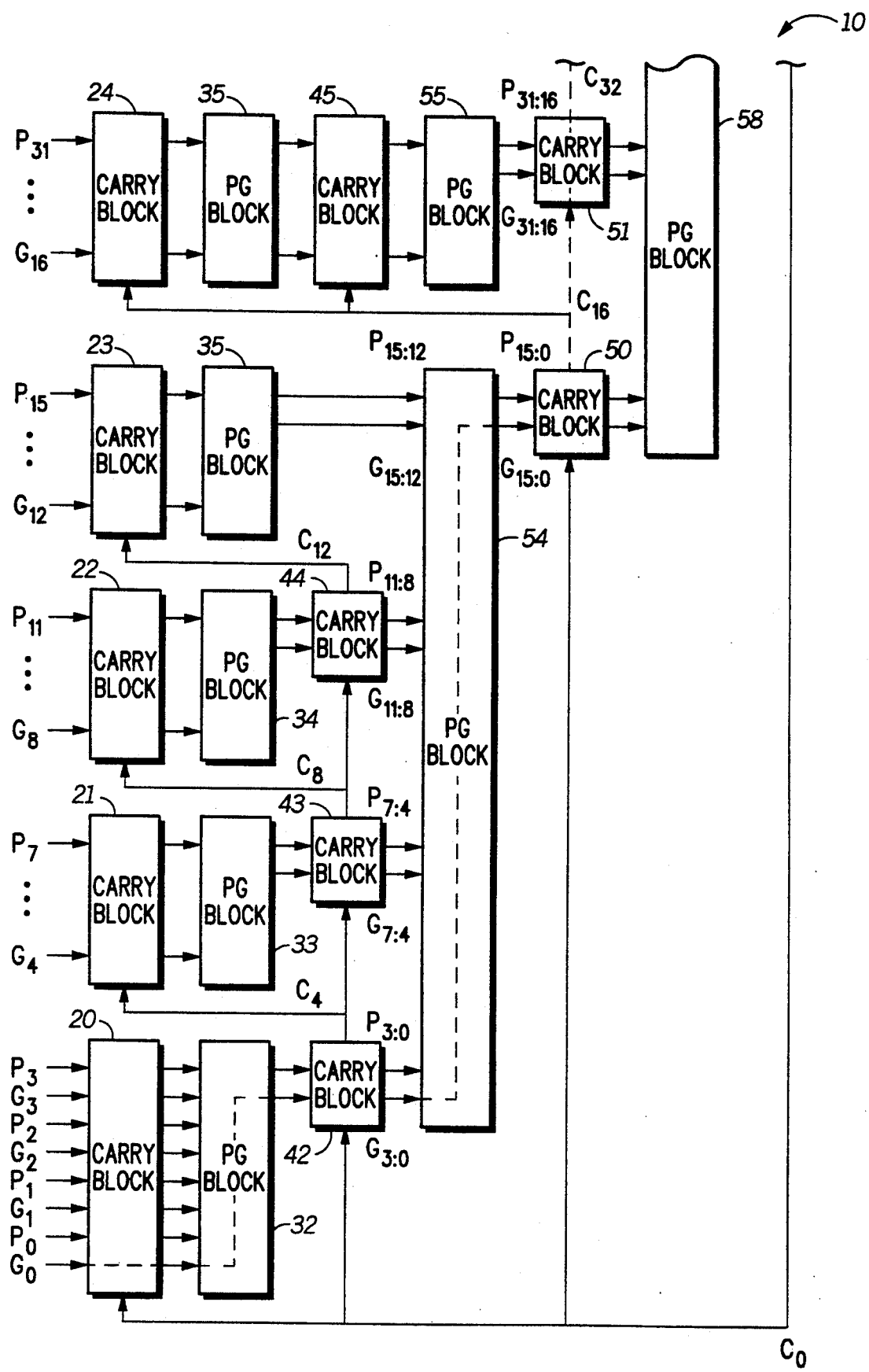
FIG. 1 illustrates in block diagram form the lower 32-bits of a 64-bit CLA adder.
Figure 2:
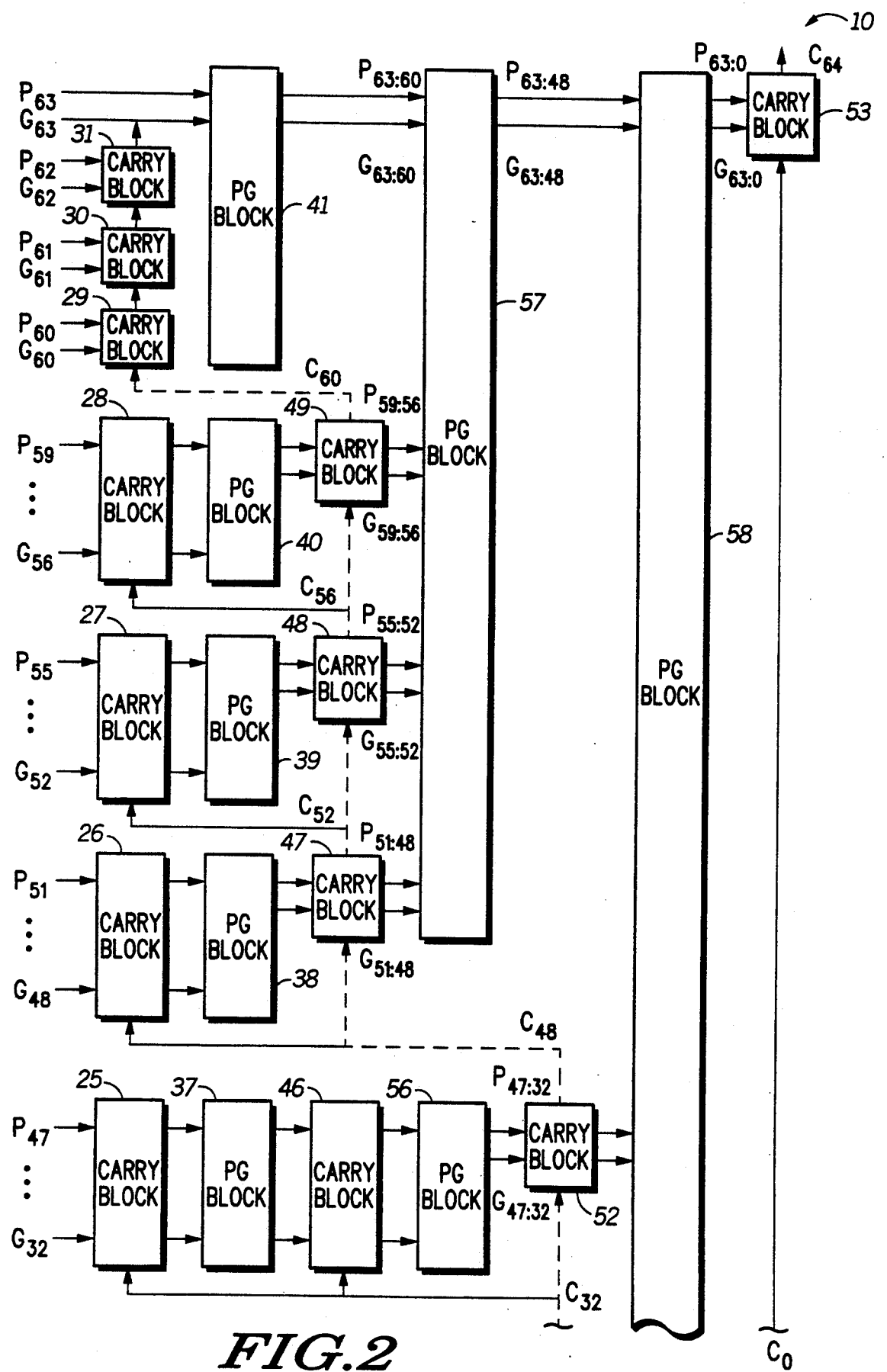
FIG. 2 illustrates in block diagram form the upper 32-bits of a 64-bit CLA adder.
Figure 3:
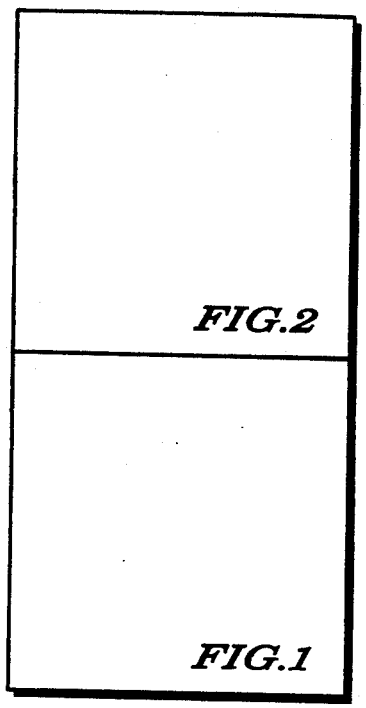
FIG. 3 illustrates the proper orientation of FIGS. 1 and 2.

Illustrated in FIGS. 1 and 2 are the lower 32-bits and upper 32-bits, respectively, of a CLA adder 10 for performing 64-bit CLA addition in group sizes of four bits. FIG. 3 illustrates the proper orientation of FIGS. 1 and 2. The CLA adder 10 is a multi-level look-ahead structure for performing CLA addition in group sizes of four bits. As illustrated in FIGS. 1 and 2, the CLA adder 10 has a first level of carry logic blocks 20–31, a first level of propagate-generate (PG) logic blocks 32–41, a second level of carry logic blocks 42–49, a second level of PG logic blocks 54–57, a third level of carry logic blocks 50–52, a third level PG logic block 58, and a fourth level carry logic block 53. Each level of CLA adder 10 is composed of has multiple four bit adder slices. In FIGS. 1 and 2, the structure for the lower 16-bits (0:15) and the upper 16-bits (48:63) of CLA adder 10 is illustrated in expanded form. For simplification purposes only, the structure for the middle 32-bits (16:47) is illustrated in condensed form, although the circuit implementation for each adder slice is identical.

In CLA addition, there is a carry (C) into the next $(i+1)^{th}$ slice whenever a carry is generated locally at the present $(i^{th})$ slice or whenever a carry is propagated through the $i^{th}$ slice from the preceding $(i-1)^{th}$ slice. As illustrated in FIGS. 1 and 2, the propagation of the carry from the first slice to the last slice forms a carry chain. The critical carry chain delay path is highlighted by the dashed line. Accordingly, for CLA adder 10, the critical carry chain delay path from operands A and B to the $n^{th}$ carry term ($C_{63}$) may be expressed as:

$$A, \\ B\text{-}G_0\text{-}G_{3:0}\text{-}G_{15:0}\text{-}C_{16}\text{-}C_{32}\text{-}C_{48}\text{-}C_{52}\text{-}C_{56}\text{-}C_{60}\text{-}C_{61}\text{-}C_{62}\text{-}C_{63} \quad (1\text{-}1)$$

The carry generation equations associated with the dashed line (critical path) carry chain are illustrated in Table I below. Essentially, in CLA addition, a local carry ($C_i$) is generated if both $A_i$ and $B_i$ are logic ones. Accordingly, the equation for the generate term is $G_i = A_i \cdot B_i$ (where·denotes a logical AND). A carry (C) is propagated when either $A_i$ or $B_i$ is a logic one, and thus, the equation for the propagate term is $P_i = A_i \oplus B_i$ (where $\oplus$ denotes EXCLUSIVE-OR), as illustrated in Table I below.

Figure 4:
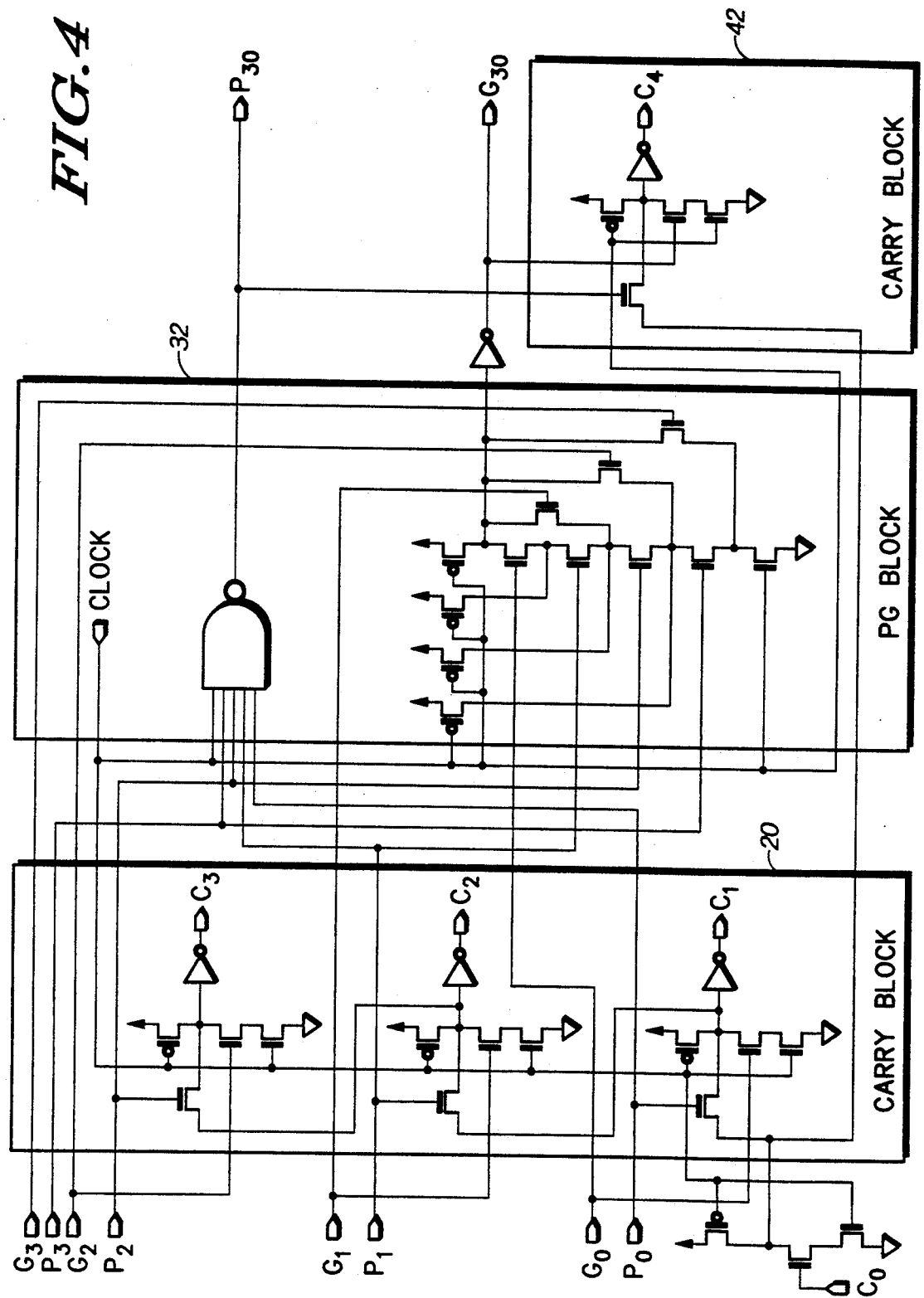
FIG. 4 illustrates in partial schematic form a first slice of the adder of FIGS. 1 and 2 comprising carry and propagate generate logic.

TABLE I $P = A \oplus B$ (propagate)
$G = A \cdot B$ (generate)
$C_1 = G_0 + C_0 \bullet P_0$
$C_2 = G_1 + C_1 \bullet P_1 = G_1 + G_0 \bullet P_1 + C_{in} \bullet P_0 \bullet P_1$
$C_3 = G_2 + C_2 \bullet P_2 = G_2 + G_1 \bullet P_2 + G_0 \bullet P_1 \bullet P_2 + C_{in} \bullet P_0 \bullet P_1 \bullet P_2$
$C_4 = G_3 + C_3 \bullet P_3 = (G_3 + G_2 \bullet P_3 + G_1 \bullet P_2 \bullet P_3 + G_0 \bullet P_1 \bullet P_2 \bullet P_3) + C_0 \bullet (P_0 \bullet P_1 \bullet P_2 \bullet P_3)$
$\quad = G_{3:0} + C_0 \bullet P_{3:0}$
$C_8 = G_{7:4} + C_4 \bullet P_{7:4} = (G_{74} + G_{3:0} \bullet P_{7:4}) + C_0 \bullet (P_{3:0} \bullet P_{7:4})$
$C_{12} = G_{11:8} + C_8 \bullet P_{11:8}$
...
$C_{16} = G_{15:12} + C_{12} \bullet P_{15:12}$
$\quad = G_{15:12} + G_{11:8} \bullet P_{15:12} + G_{7:4} \bullet P_{11:8} \bullet P_{15:12} + G_{3:0} \bullet P_{7:4} \bullet P_{11:8} \bullet P_{15:12} + C_0 \bullet P_{3:0} \bullet P_{7:4} \bullet P_{11:8} \bullet P_{15:12}$
$\quad = G_{15:0} + C_0 \bullet P_{15:0}$
$C_{32} = G_{31:16} + C_{16} \bullet P_{31:16}$
$C_{48} = G_{47:32} + C_{32} \bullet P_{47:32}$
$C_{64} = G_{63:0} + C_0 \bullet P_{63:0}$
$S_n = P_n \oplus C_n$ FIG. 4 illustrates in partial schematic form the circuit implementation for a four-bit slice of a CLA adder 10 having carry logic block 20, PG logic block 32, and carry logic block 42. As illustrated in FIG. 4, carry logic block 20 receives the bit propagate and bit generate terms $P_0$, $P_1$, $P_2$, $P_3$, and $G_0$, $G_1$, $G_2$, $G_3$, respectively, and a carry-in (C) term, all of which are provided by 4-bit adder logic (not shown). The carry logic block 20 uses the bit propagate, bit generate, and carry-in terms to generate a set of local carry-out terms $C_1$, $C_2$, and $C_3$, in Manchester chain style, in accordance with the carry generation equations illustrated in Table I. There are three levels of propagation delay from the initial carry-in term ($C_0$) to the most significant carry-out term ($C_3$). The PG logic block 32 logically combines the bit propagate and bit generate terms to determine the 4-bit (3:0) group propagate and group generate terms, $P_{3:0}$ and $G_{3:0}$, respectively. Using the group propagate and group generate terms, $P_{3:0}$ and $G_{3:0}$, carry logic block 42 generates a carry term $C_4$.

As illustrated in FIG. 1, the carry term $C_4$ is carried to carry logic block 21, and carry logic block 43. Within a second four bit slice of CLA adder 10, PG logic block 33 uses the bit propagate ($P_4$, $P_5$, $P_6$, $P_7$) and bit generate ($G_4$, $G_5$, $G_6$, $G_7$) terms, to generate the group propagate and group generate terms, $P_{7:4}$, and $G_{7:4}$, respectively. Similarly, within a third four bit slice of CLA adder 10, PG logic block 34 uses the bit propagate ($P_8$, $P_9$, $P_{10}$, $P_{11}$) and bit generate ($G_8$, $G_9$, $G_{10}$, $G_{11}$) terms to generate the group propagate and group generate terms, $P_{11:8}$, and $G_{11:8}$, respectively. In a like manner, within a fourth four bit slice of CLA adder 10, PG logic block 35 generate the group propagate and group generate terms, $P_{15:12}$ and $G_{15:12}$, respectively. The second level PG logic block 54 generates the group propagate $P_{15:0}$ and group generate $G_{15:0}$ terms from the first level P and G terms, ($P_{3:0}$, $P_{7:4}$, $P_{11:8}$, and $P_{15:12}$) and ($G_{3:0}$, $G_{7:4}$, $G_{11:8}$, and $G_{15:0}$), respectively. The CLA addition proceeds accordingly in a recursive manner, with the group propagate, group generate and carry terms being generated using the equations illustrated in Table I above. In the critical path (1-1) for CLA adder 10, the external carry-in ($C_0$) is needed for the generation of carry term $C_{16}$. Accordingly, the propagation delay associated with the generation of carry term $C_{16}$, directly impacts the speed of CLA adder 10.

Figure 7:
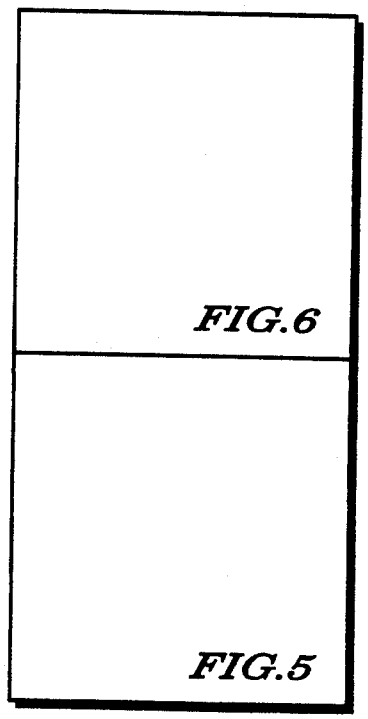
FIG. 7 illustrates the proper orientation of FIGS. 5 and 6.
Figure 5:
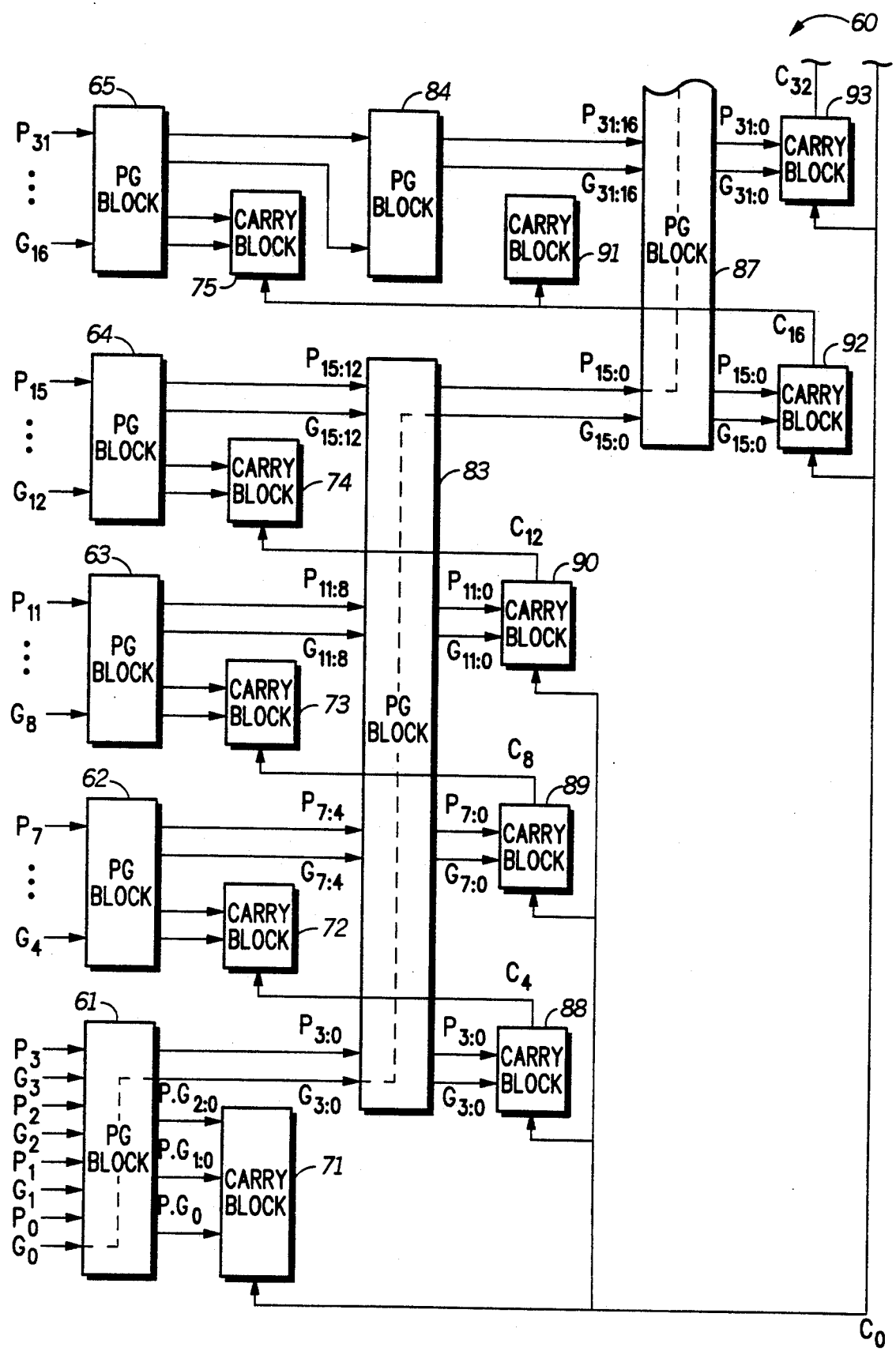
FIG. 5 illustrates in block diagram form the lower 32-bits of a 64bit CLA adder according to the present invention.
Figure 6:
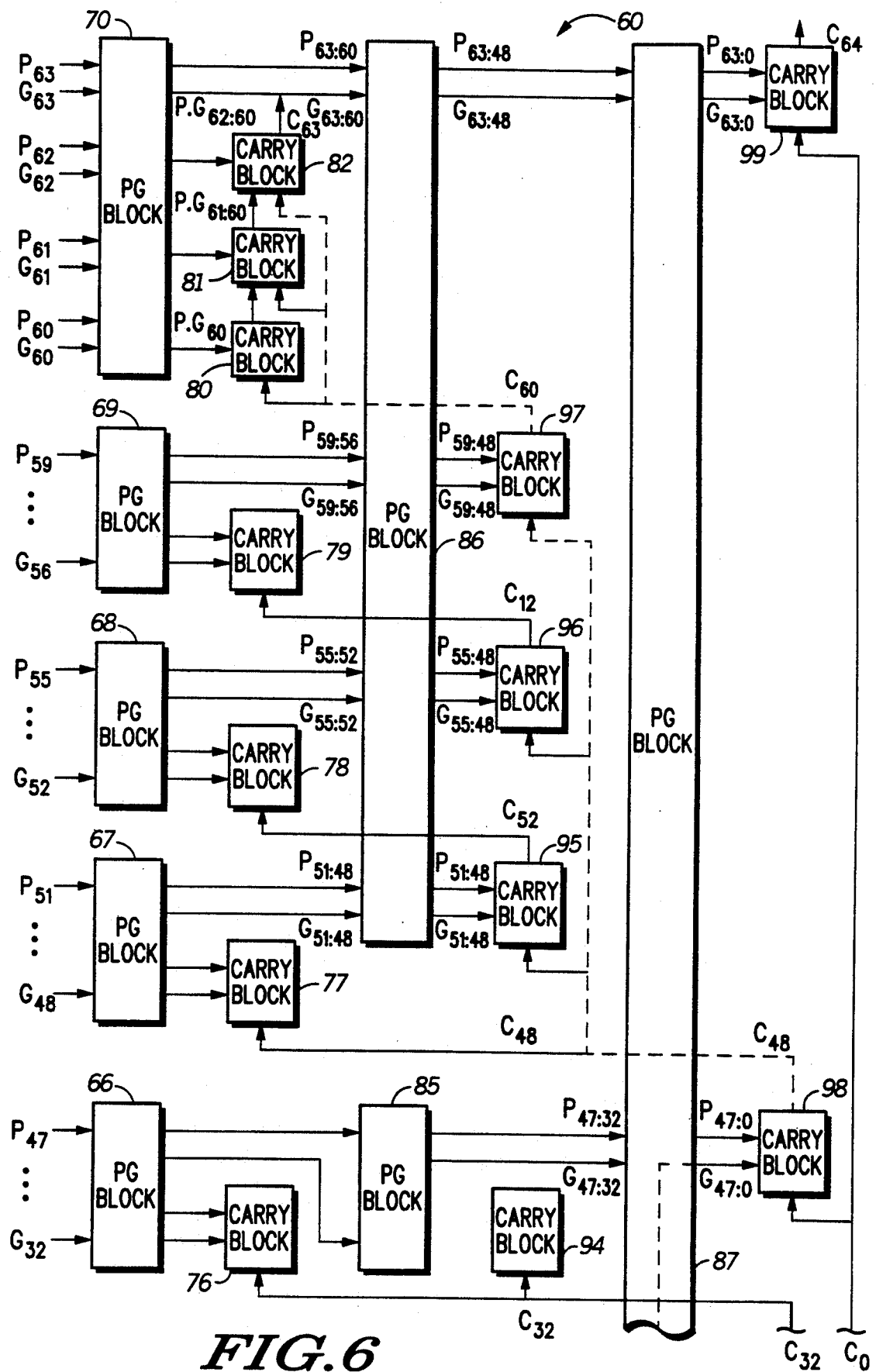
FIG. 6 illustrates in block diagram form the upper 32-bits of the 64-bit CLA adder according to the present invention.

Illustrated in FIGS. 5 and 6 are the lower 32-bit portion 60a and upper 32-bit portion 60b, respectively, of a CLA adder 60 for performing 64-bit CLA addition, in accordance with the present invention. FIG. 7 illustrates the proper orientation of FIGS. 5 and 6. The CLA adder 60 is a multi-level look-ahead structure for performing CLA addition in group sizes of four bits. As illustrated in FIGS. 5 and 6, the CLA adder 60 has first level PG logic blocks 61–70, first level carry logic blocks 71–82, second level PG logic blocks 83–86, second level carry logic blocks 88–97, a third level PG logic block 87, and third level carry logic blocks 92–99. In FIGS. 5 and 6, the structure for the lower 16-bits (0:15) and the upper 16-bits (48:63) of CLA adder 60 is illustrated in expanded form. For simplification purposes only, the structure for the middle 32-bits (16:47) is illustrated in condensed form, although the circuit implementation at each adder slice is identical.

Figure 8:
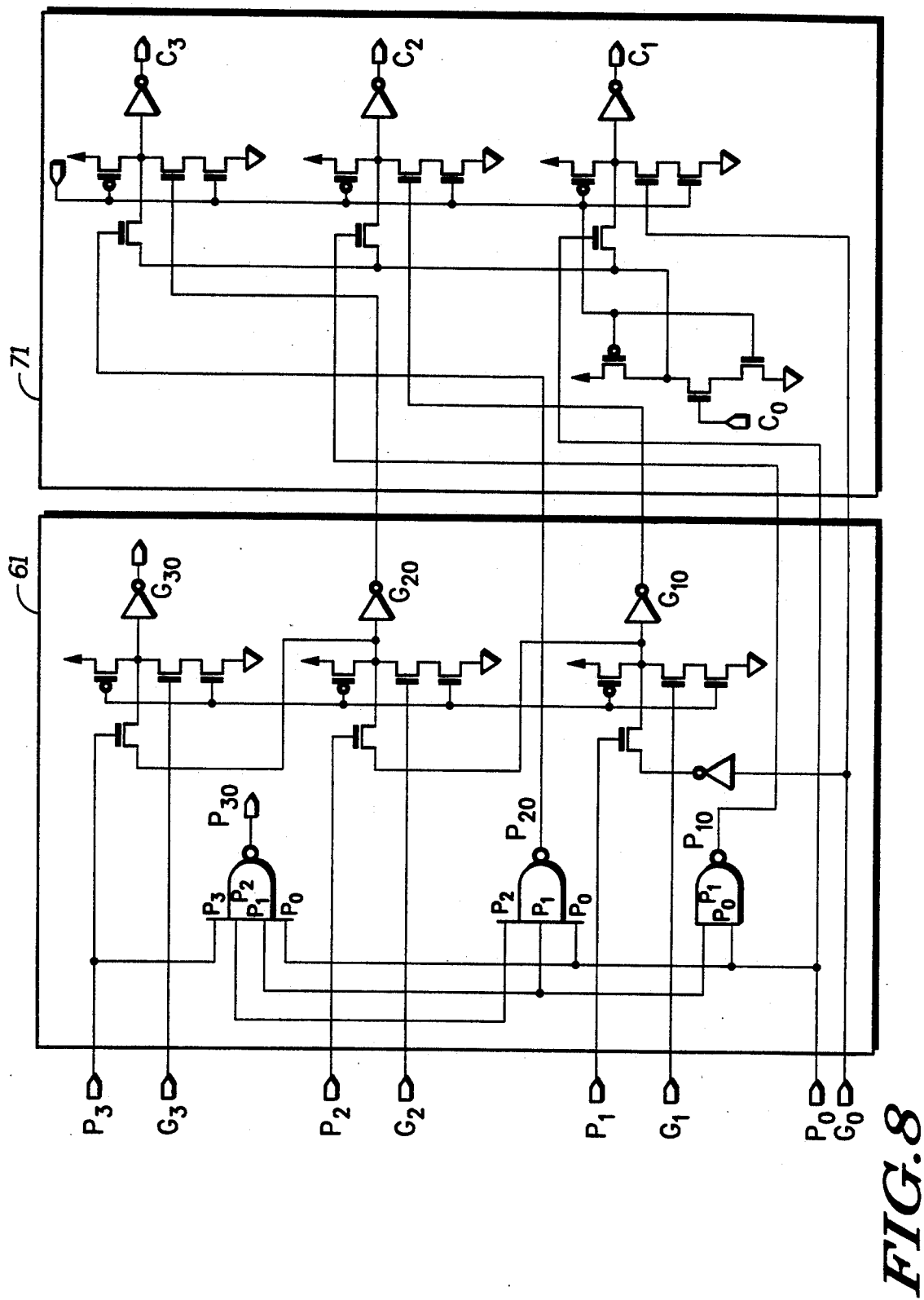
FIG. 8 illustrates in partial schematic form a first slice of the adder of FIGS. 5 and 6 comprising modified carry and propagate generate logic according to the present invention.

In accordance with the present invention, CLA adder 60 employs a modified multi-level structure. The build-up of the group propagate and group generate (P, G) terms is similar to that of CLA adder 10; however, the P, G terms are also generated at intermediate locations, thereby facilitating the evaluation of the carry's in parallel. The use of a Manchester chain design to produce the group generate (e.g. $G_{3:0}$) term(s) allows the intermediate group generates (e.g. $G_{1:0}$, $G_{2:0}$) to be generated by PG logic block 61 without any extra hardware, as illustrated in FIG. 8. Extra circuitry is required to produce the intermediate group propagate terms (e.g. $P_{1:0}$, $P_{2:0}$), as indicated by the dashed line. This extra circuitry does not translate into a substantial increase in silicon area since the intermediate propagate bits are not the limiting factor in determining the bit cell size. Accordingly, as illustrated in FIG. 8, the PG logic block 62 generates intermediate group propagate and group generate (P, G) terms, in addition to the four bit group P, G terms. Using the intermediate group propagate and group generate terms, and the external carry $C_0$, the carry logic block 71 generates, in parallel, three local carry-out terms $C_1$, $C_2$ and $C_3$, the most significant of which is $C_3$. Due to the generation of the intermediate group P, G terms, in CLA adder 60 the delay to any carry-out term is only one level, as opposed to three levels in the case of carry logic block 20 (FIG. 4) of CLA adder 10 (where a Manchester carry chain is used to generate $C_3$). In the manner previously described, at the second and subsequent levels, the group propagate (i.e. $P_{15:0}$), group generate (i.e. $G_{15:0}$), and the intermediate group P, G terms (i.e. $P_{11:0}$, $G_{11:0}$), and carry terms are generated in accordance with the present invention.

In the present invention, the availability of the intermediate group P, G terms at every PG logic block enables the most significant carry-out term (i.e. $C_3$) delay of every carry block to be one level delay. Furthermore, in the present invention, the external carry-in ($C_0$) is required in the generation of the carry term $C_{48}$. Essentially, the carry chain is arranged to delay the requirement for a valid external carry-in ($C_0$), and to minimize the delay associated with the generation of the local carry-out terms, in accordance with the present invention. Thus, the critical carry chain delay path for CLA adder 60, as indicated by the dashed line, is:

$$A.B\text{-}G_0\text{-}G_{3:0}\text{-}G_{15:0}\text{-}G_{47:0}\text{-}C_{48}\text{-}C_{60}\text{-}C_{63} \qquad (1\text{-}2)$$

Figures 9, 10:
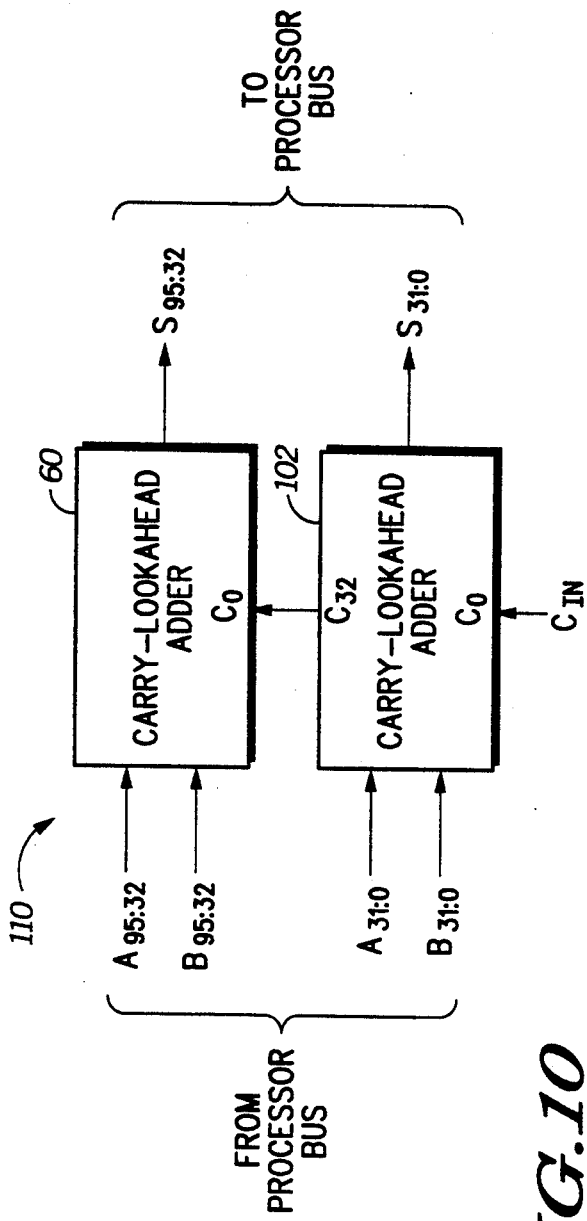
FIG. 9 illustrates a timing chart for a critical carry-chain delay path of the CLA adder of FIGS. 1 and 2, and the CLA adder of FIGS. 5 and 6.
FIG. 10 illustrates in block diagram form a 96-bit CLA adder using a combination of the adders of FIGS. 1, 2, 5, and 6.

Illustrated in FIG. 9 is Timing Chart 100 which contains an example of the timing numbers associated with carry chain critical path (1-1) for the CLA adder 10, and carry chain critical path (1-2) for CLA adder 60. These timing numbers are based upon an 0.8 micron CMOS process with $V_{DD}=5$ V and a 25° C. operating temperature. As previously indicated, CLA adder 10 requires the external carry-in ($C_0$) for the generation of $C_{16}$. Accordingly, the carry-in ($C_0$) must be valid within 1.7 nanoseconds after the availability of operands A and B, as illustrated in Timing Chart 100. The CLA adder 60 requires the external carry-in ($C_0$) for the generation of $C_{48}$, accordingly, the carry-in ($C_0$) must be valid 2.9 nanoseconds after the availability of the operands, as illustrated in Timing Chart 100. Furthermore, as illustrated in Timing Chart 100, the addition of operands A and B by CLA adder 60 is faster than that of CLA adder 10 (4.5 nanoseconds vs. 5.4 nanoseconds).

The tolerance in CLA adder 60 of a late carry-in accommodates the construction of larger adders. For example, illustrated in FIG. 10 is a block diagram of a 96-bit adder 110 comprising a 32-bit adder 102, and the 64-bit CLA adder 60 of the present invention. In a preferred embodiment, the structure of adder 102 is identical to that of the lower 32-bits of CLA adder 10 (FIG. 1). As illustrated, adder 102 receives the lower 32-bits of operands A and B ($A_{31:0}$ and $B_{31:0}$), and using CLA addition provides carry-out term $C_{32}$. As indicated in Timing Chart 100 (FIG. 9), the carry-out term $C_{32}$ is valid by 2.35 nanoseconds. Since this carry-out delay falls within the carry-in requirement (2.9 nanoseconds) of CLA adder 60, the timing of adder 102 does not effect the critical carry-chain delay path (1-2) of CLA adder 60. Essentially, the low-order 32-bit addition is effectively transparent to the operation of the CLA adder 60. This phenomenon enables the 96-bit addition to be performed in the same time (e.g. 4.5 nanoseconds) in which the CLA adder 60 performs the 64-bit addition, an in less time than the CLA adder 10.

Thus, in accordance with the present invention, the generation of the intermediate P, G terms by CLA adder 60, at every bit position, reduces the delay associated with the generation of any local carry-out term (i.e. $C_1$, $C_2$, $C_3$) to one level. Since CLA adder 60 generates the intermediate group propagate and intermediate group generate terms, in addition to the group P, G terms, the requirement for the availability of the external carry-in ($C_0$) is delayed until the generation of carry term $C_{48}$. The delayed carry-in enables the operation of the lower order 32-bit adder 102 to be transparent to the upper 64-bit CLA adder 60. Consequently, the 96-bit addition is performed in the same time as a 64-bit addition. Furthermore, the time required to perform the 96-bit addition is less than that required to perform a 64-bit addition using a 64-bit CLA adder 10. As illustrated in FIG. 8, in a preferred embodiment, PG logic block 61 has 44 transistors as opposed to 24 transistors for the PG logic block 32 of CLA adder 10. The additional transistors will minimally impact the silicon area required for implementing PG logic block 61 because the intermediate P, G bits are not the limiting factor in determining bit cell size.

While the present invention has been described in accordance with a preferred embodiment of the PG logic and carry logic blocks, it should be apparent to one of ordinary skill in the art that the invention may be practiced in numerous ways. For example, the invention may be practiced using a carry-select adder structure, in which case all the carry blocks must be duplicated, and a multiplexor employed to select between carries. The use of a carry-select adder in conjunction with the present invention will produce faster add times; however, additional silicon area is required for its implementation. Accordingly, it is intended by the appended claims to cover all modifications of the invention which fall within the true spirit and scope of the invention.

We claim:

1. In a multi-level carry look-ahead (CLA) adder having a predetermined number of adder levels comprising a predetermined number of n-bit adder slices, where n is an integer equal to a fan-in value for said adder, a method for adding a first operand to a second operand in the adder by using carry look-ahead addition using said multi-level carry look-ahead adder, said method comprising the steps of:

generating, within each of said predetermined number of adder slices, a predetermined number of intermediate group propagate and group generate terms for each of a plurality of bit locations in said adder, while simultaneously generating a predetermined number of n-bit group propagate and group generate terms for each of the plurality of bit locations, in response to receiving said first and said second operands, said group propagate and group generate terms being used to generate a predetermined number of group carry-out terms, and said predetermined number of intermediate group propagate and group generate terms and said n-bit group propagate and group generate terms being generated without using a carry-in signal; and using said predetermined number of intermediate group propagate and group generate terms, and a carry-in term provided by a source external to said adder slices, to generate in parallel a predetermined number of local carry-out terms for each of said predetermined number of adder slices in said multi-level adder, a most significant one of said predetermined number of local carry-out terms for each of said adder slices being generated within each adder slice in a single gate propagation delay.

2. The method of claim 1 further comprising the step of providing a carry chain propagation delay path within said multi-level CLA adder which selectively uses said intermediate group propagate and group generate terms and preselected ones of said predetermined number of group carry-out terms to accommodate a delayed carry-in of an external carry term, said external carry term being provided by a logic unit external to said CLA adder.

3. The method of claim 1 wherein said step of generating a predetermined number of intermediate group propagate and group generate terms while simultaneously generating a predetermined number of n-bit group propagate and group generate terms comprises the steps of:
logically combining a predetermined number of bit propagate terms to produce said intermediate propagate terms for each bit position in said adder, while simultaneously producing said group propagate term; and
logically combining a predetermined number of bit propagate and bit generate terms to produce said predetermined number of n-bit group generate terms, while simultaneously producing said intermediate group generate terms.

4. In a carry look-ahead (CLA) adder having a predetermined number of adder levels comprising a predetermined number of n-bit adder slices, where n is an integer equal to a fan-in value for said adder, a method for adding a first operand to a second operand in the adder by using carry look-ahead addition, said method comprising the steps of:
generating, within each of said predetermined number of adder levels, a predetermined number of intermediate group propagate and group generate terms for each of a plurality of bit locations in said adder, while simultaneously generating a predetermined number of n-bit group propagate and group generate terms for each of the plurality of bit locations, in response to receiving said first and said second operands, said group propagate and group generate terms being used to generate a predetermined number of group carry-out terms, and said predetermined number of intermediate group propagate and group generate terms and said n-bit group propagate and group generate terms being generated without using a carry-in signal;
using said predetermined number of intermediate group propagate and group generate terms, and a carry-in term provided by a source external to said adder slices, to generate in parallel a predetermined number of local carry-out terms at each of said predetermined number of adder slices in said multi-level adder, a most significant one of said local carry-out terms being generated within each adder slice in a single gate propagation delay, said carry-in term being used only to generate said predetermined number of local carry-out terms; and
providing a carry chain propagation delay path within said CLA adder which selectively uses said intermediate group propagate and group generate terms and preselected ones of said predetermined number of group carry-out terms to accommodate a delayed carry-in of an external carry term, said external carry term being provided by a logic unit external to said CLA adder.

5. The method of claim 4 wherein said step of generating a predetermined number of intermediate group propagate and group generate terms while simultaneously generating a predetermined number of n-bit group propagate and group generate terms comprises the steps of:
logically combining a predetermined number of bit propagate terms to produce said intermediate propagate terms for each bit position in said adder, while simultaneously producing said group propagate term; and
logically combining a predetermined number of bit propagate and bit generate terms to produce said predetermined number of n-bit group generate terms, while simultaneously producing said intermediate group generate terms.

6. A carry look-ahead (CLA) adder having a predetermined number of adder levels wherein each adder level comprises a predetermined number of n-bit adder slices, where n is an integer equal to a fan-in value for said adder, for adding a first operand to a second operand using carry look-ahead addition, said CLA adder comprising:
first means for generating, within each of said predetermined number of adder levels, a predetermined number of intermediate group propagate and group generate terms for each of a plurality of bit locations in said adder, while simultaneously generating a predetermined number of n-bit group propagate and group generate terms for each of the plurality of bit locations, in response to receiving said first and said second operands, said group propagate and group generate terms being used to generate a predetermined number of group carry-out terms, said first means generating said predetermined number of intermediate group propagate and group generate terms and said n-bit group propagate and group generate terms being without using a carry-in signal;
second means coupled to said first means for using said predetermined number of intermediate group propagate and group generate terms, a predetermined number of bit propagate and bit generate terms, and a carry-in term provided by a source external to said adder slice, to generate in parallel a predetermined number of local carry-out terms at each of said predetermined number of adder levels in said CLA adder, a most significant one of said local carry-out terms being generated at each adder slice in a single gate propagation delay; and
said adder providing a carry chain propagation delay path within said CLA adder which selectively uses said intermediate group propagate and group generate terms and preselected ones of said predetermined number of group carry-out terms to accommodate a delayed carry-in of an external carry term, said external carry term being provided by a logic unit external to said CLA adder.

7. The CLA adder of claim 6 wherein said first means comprises:
third means for selectively combining a predetermined number of bit propagate terms to produce said intermediate propagate terms for each bit position in said adder, said logic means simultaneously producing said group propagate terms; and fourth means for selectively combining a predetermined number of bit propagate and bit generate terms to produce said intermediate group generate terms, at each bit position in said adder, while simultaneously producing said group generate terms.

8. In a data processor, an x-bit carry look-ahead (CLA) adder, where x is an integer equal to a word size of said adder, said CLA adder having a predetermined number of adder levels wherein each adder level comprises a predetermined number of n-bit adder slices, where n is an integer equal to a fan-in value for said adder, for adding a first operand to a second operand using carry look-ahead addition, said CLA adder comprising:

first means generating, within each of said predetermined number of adder levels, a predetermined number of intermediate group propagate and group generate terms for each of a plurality of bit locations in said adder, while simultaneously generating a predetermined number of n-bit group propagate and group generate terms for each of the plurality of bit locations, in response to receiving said first and said second operands, said group propagate and group generate terms being used to generate a of group carry-out terms, said first means generating said predetermined number of intermediate propagate and generate terms and said predetermined number of group propagate and generate terms without using a carry-in signal;

second means coupled to said first means for using said predetermined number of intermediate group propagate and group generate terms, and a carry-in term provided by a source external to said adder slices, to generate in parallel a predetermined number of local carry-out terms at each of said predetermined number of adder slices in said CLA adder, a most significant one of said local carry-out terms being generated within each adder slice in a single gate propagation delay, said external carry-in term being coupled only to said second means; and said adder providing a carry chain propagation delay path within said CLA adder which selectively uses said intermediate group propagate and group generate terms and a preselected ones of said predetermined number of group carry-out terms to accommodate a delayed carry-in of an external carry term, said external carry term being provided by a second y-bit adder to facilitate addition of (x+y) bits, where y is an integer smaller than x, in a same time interval as said CLA adder performs an x-bit addition.

9. The CLA adder of claim 8 wherein said first means comprises:

third means for selectively combining a predetermined number of bit propagate terms to produce said intermediate propagate terms for each bit position in said adder, said logic means simultaneously producing said group propagate terms; and fourth means for selectively combining a predetermined number of bit propagate and bit generate terms to produce said intermediate generate terms, at each bit position in said adder, while simultaneously producing said group generate terms.

10. A carry look-ahead (CLA) adder having a predetermined number of adder levels wherein each adder level comprises a predetermined number of n-bit adder slices, where n is an integer equal to a fan-in value for said adder, for adding a first operand to a second operand using carry look-ahead addition, said CLA adder comprising:

propagate-generate logic circuitry for generating, within each of said predetermined number of adder levels, a predetermined number of intermediate group propagate and group generate terms for each of a plurality of bit locations in said adder, while simultaneously generating a predetermined number of n-bit group propagate and group generate terms for each of the plurality of bit locations, in response to receiving said first and said second operands, said propagate-generate logic circuitry generating said predetermined number of intermediate group propagate and group generate terms and said n-bit group propagate and group generate terms being without using a carry-in signal, and said group propagate and group generate terms being used to generate a predetermined number of group carry-out terms;

carry logic circuitry coupled to said propagate-generate logic circuitry for receiving said predetermined number of intermediate group propagate and group generate terms, a predetermined number of bit propagate and bit generate terms, and a carry-in term provided by a source external to said adder slice, and for generating in parallel a predetermined number of local carry-out terms at each of said predetermined number of adder levels in said CLA adder, a most significant one of said local carry-out terms being generated by said carry logic circuitry at each adder slice in a single gate propagation delay; and said adder providing a carry chain propagation delay path within said CLA adder which selectively uses said intermediate group propagate and group generate terms and preselected ones of said predetermined number of group carry-out terms to accommodate a delayed carry-in of an external carry term, said external carry term being provided by a logic unit external to said CLA adder.

* * * * *